Jan. 7, 1936.　　　D. H. STEWART　　　2,027,004
CAMERA LATCH
Filed April 27, 1934

Inventor:
Donald H. Stewart,
Newton M. Perrins

Patented Jan. 7, 1936

2,027,004

UNITED STATES PATENT OFFICE 2,027,004

CAMERA LATCH

Donald H. Stewart, Rochester, N. Y., assignor to Eastman Kodak Company, Rochester, N. Y., a corporation of New York Application April 27, 1934, Serial No. 722,712

2 Claims. (Cl. 292—147)

This invention relates to photography and more particularly to photographic cameras. One object of the invention is to provide a camera latch particularly adapted for use on cameras made of a molded composition. Another object of the invention is to provide a camera latch which is simple in construction and which requires a minimum number of parts. Another object of the invention is to provide a camera latch with a U-shaped slidable member having an opening in one wall through which a lug on the opposite camera part may pass and may become engaged in a hollow, box-like receptacle formed by the U-shaped member. Another object of my invention is to provide a camera latch with a slide adapted to be held in an operative or an inoperative position by means of a plate which holds the slide in position, and other objects will appear from the following specification, the novel features being particularly pointed out in the claims at the end thereof.

Coming now to the drawing wherein like reference characters denote like parts throughout:

I have illustrated a camera latch on a simple form of camera which may consist of a body portion 1 having a back 2 which may be separated from the body along the line 3, such cameras being of well-known construction.

Figure 3:
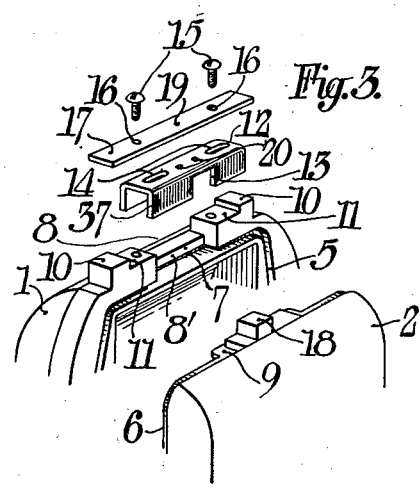
Fig. 3 is a fragmentary perspective view showing the latch parts in separated position and showing the interengaging parts of the camera.

In order to hold the camera back 2 to the camera body 1, I have provided a latch the elements of which are shown in a separated position in Fig. 3.

It should be noted that the camera body 1 is provided with a groove 5 which extends around the opening in the camera body 1 and into which a corresponding flange 6 on the camera back 2 may fit to form a light-tight joint. This groove 5 is somewhat deepened over an area 7 in the top wall 8 of the camera to receive an extended flange 9 on the camera back, so as to form a light-tight joint beneath the cooperating latch elements.

Figure 1:
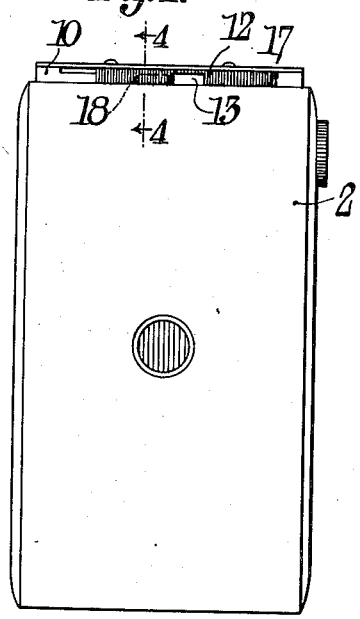
Fig. 1 is a rear elevation of a camera equipped with a latch constructed in accordance with my invention.
Figure 2:
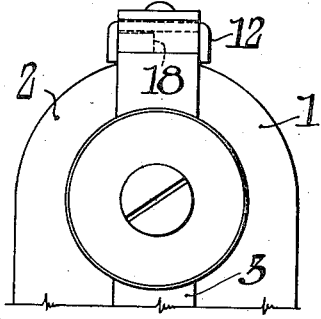
Fig. 2 is a fragmentary end elevation showing the camera latch used on the camera of Fig. 1, on a somewhat enlarged scale.
Figure 4:
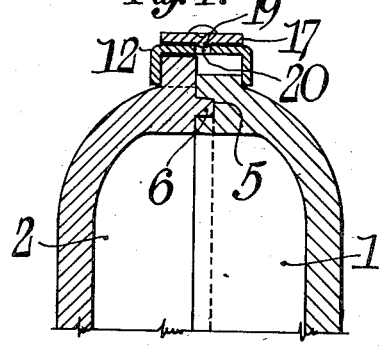
Figure 4 is a section line 4—4 of Fig. 1.

The camera body is provided with a pair of spaced posts 10, these posts each being provided with a recess 11 so as to form stops for a latching slide 12. This slide, as best shown in Fig. 3, may be U-shaped in cross-section, one of the downwardly extending flanges forming the U being provided with a recess or aperture 13. The top wall of the U-shaped member is preferably slotted, as shown at 14, to receive the screws 15 which pass down through apertures 16 in a cover plate 17, this cover plate forming a smooth, relatively fixed cover for the sliding latching bar 12. When in an inoperative position, which, in the form shown in Fig. 1, is when the latching bar 12 is slid to the left until the post 10 stops the movement of the bar, the lug 18 of the camera back 2 is adapted to pass through the aperture 13. When, however, the slide is moved to the right to an operative position, as shown in Fig. 1, the lug 18 is retained in the hollow, box-like receptacle which is formed by the U-shaped member 12 and by the posts 10.

In order to hold the sliding member 12 in either an operative or an inoperative position, I preferably provide a spring latch in the form of a protuberance 19 projecting downwardly from the plate 17, so that it may extend into either one of two apertures 20 formed in the top of the slide 12.

Since the lug 18 is carried by the camera back 2, and since the flange 6 of the camera back fits into the groove 5, which, as above explained, extends entirely around the camera body, the lug 18 is always guided in the proper path to pass through the aperture 13 when the sliding member is properly positioned.

The top plate 17 prevents the slide 12 from being accidentally moved and yet the edges of the U-shaped member are always accessible so that an operator may readily move the slide to the desired position.

I prefer to serrate or roughen the slide member as shown in Fig. 3 at 37 to facilitate moving the slide.

The operation of such a latch is extremely simple. With the camera back 2 latched on the camera body 1, the locking slide may be moved until the notch 13 lies over the lug 18. The parts of the camera may then be separated. To latch the camera back on the camera, the lug 18 is swung through the notch 13 and the slide is moved until the lug lies in the hollow, box-like opening defined by the U-shaped member and the end posts 10.

Having thus described my invention, what I claim as new and desire to secure by Letters Patent of the United States is:

1. In a latch for cameras including two relatively movable parts, the combination with a pair of spaced posts on one member, a slide mounted on the spaced posts including downwardly extending flanges forming with the posts a hollow, box-like receptacle between the posts, one downwardly extending flange including an aperture, a lug on the other relatively movable part adapted to pass through the apertured flange into the box-like receptacle between the posts and flanges, and means including a plate fastened at its ends to the posts and overlying the slide for retaining the slide on the camera.

2. In a latch for cameras including two relatively movable parts, the combination with a pair of spaced posts on one member, a slide mounted on the spaced posts including downwardly extending flanges forming with the posts a hollow, box-like receptacle between the posts, one downwardly extending flange including an aperture, a lug on the other relatively movable part adapted to pass through the apertured flange into the box-like receptacle between the posts and flanges, and means including a plate fastened at its ends to the posts and overlying the slide for retaining the slide on the camera, there being a pimple and dimple connection between the plate and slide for retaining the latter part in a set position.

DONALD H. STEWART.